United States Patent
Kitazaki et al.

(10) Patent No.: US 6,891,692 B2
(45) Date of Patent: May 10, 2005

(54) DISK DRIVE APPARATUS, HEAD POSITION CONTROL METHOD, AND HARD DISK DRIVE

(75) Inventors: Nobuyuki Kitazaki, Chigasaki (JP); Kenji Ogasawara, Fujisawa (JP); Masahiro Shimizu, Yamato (JP)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 428 days.

(21) Appl. No.: 10/068,602

(22) Filed: Feb. 5, 2002

(65) Prior Publication Data

US 2002/0118484 A1 Aug. 29, 2002

(30) Foreign Application Priority Data

Feb. 28, 2001 (JP) ........................................ 2001-055997

(51) Int. Cl.[7] ............................................... G11B 5/596
(52) U.S. Cl. ............................... 360/77.02; 360/78.04; 360/61
(58) Field of Search ............................... 360/75, 77.02, 360/78.01, 46, 65, 78.04, 61

(56) References Cited

U.S. PATENT DOCUMENTS

| | | | | |
|---|---|---|---|---|
| 4,048,660 A | * | 9/1977 | Dennison et al. | ........ 360/77.08 |
| 5,187,619 A | * | 2/1993 | Sidman | .................... 360/77.08 |
| 6,140,791 A | * | 10/2000 | Zhang | ........................ 318/632 |

FOREIGN PATENT DOCUMENTS

| | | |
|---|---|---|
| JP | 06-267211 | 9/1994 |
| JP | 09-073618 | 3/1997 |
| JP | 10-269675 | 10/1998 |
| JP | 11-317033 | 11/1999 |
| JP | 2000-235403 | 8/2000 |
| JP | 2000-311454 | 11/2000 |

* cited by examiner

*Primary Examiner*—Sinh Tran
*Assistant Examiner*—K. Wong
(74) *Attorney, Agent, or Firm*—Robert B. Martin; Dillon & Yudell LLP

(57) ABSTRACT

A position control system for a magnetic head improves servo tracking characteristics in a low frequency range without impairing the stability of seek operations. The position control system is equipped with two integrators: a first integrator 43 and second integrator 45. The gain K3' of the second integrator 45 is set larger than the gain K3 of the first integrator 43. The first integrator 43 plays the role of offsetting the bias force acting on the magnetic head while the second integrator 45 plays the role of improving the servo tracking characteristics in the low frequency range.

11 Claims, 9 Drawing Sheets

[Figure 1]
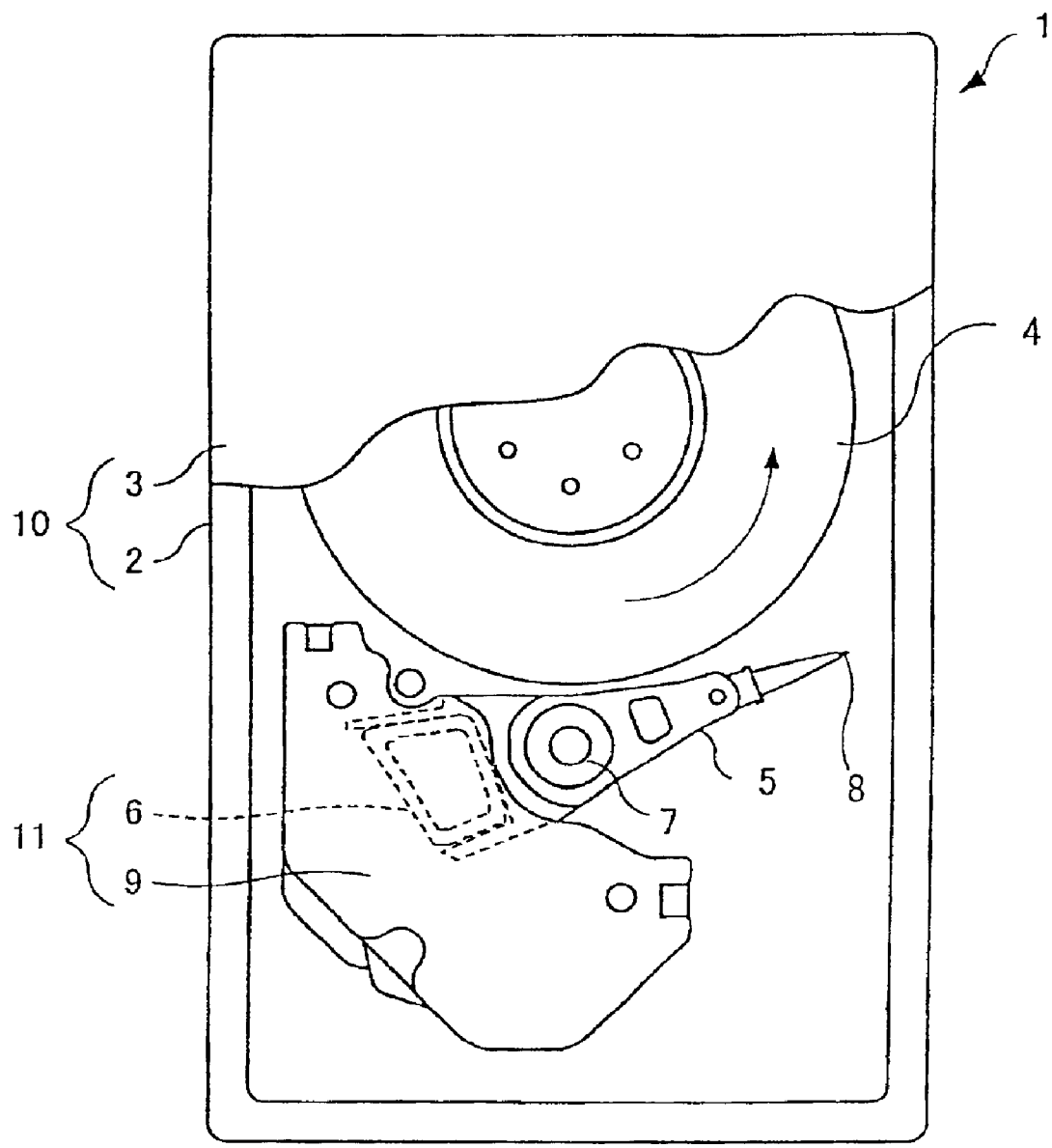

[Figure 2]
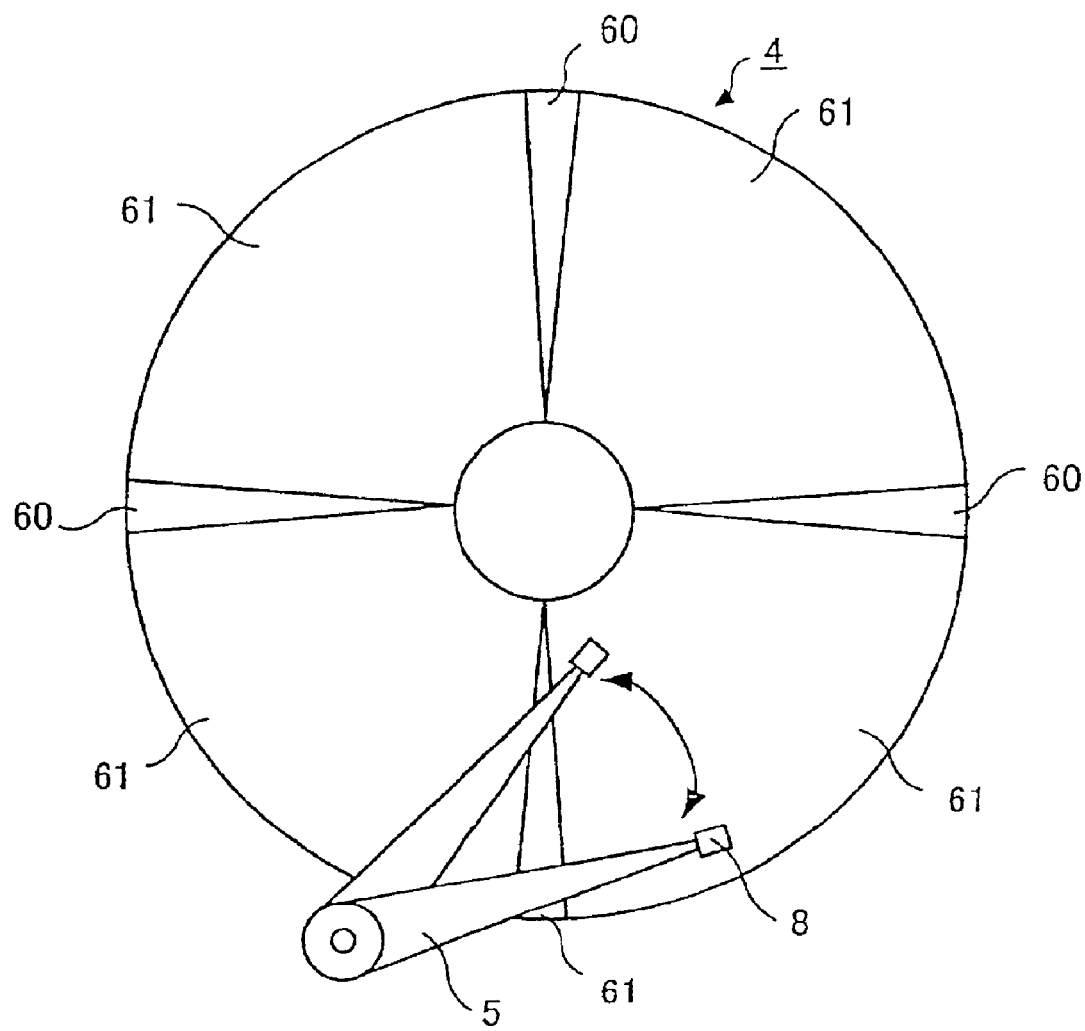

[Figure 3]
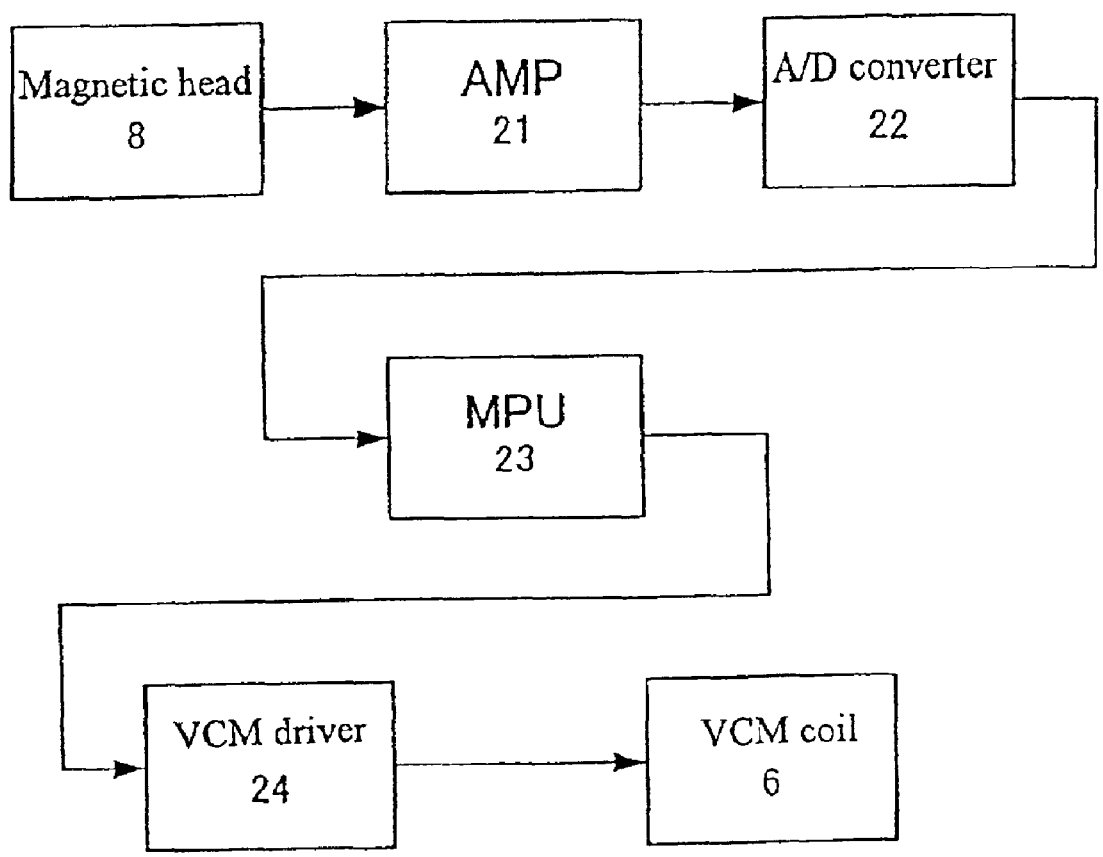

[Figure 4]
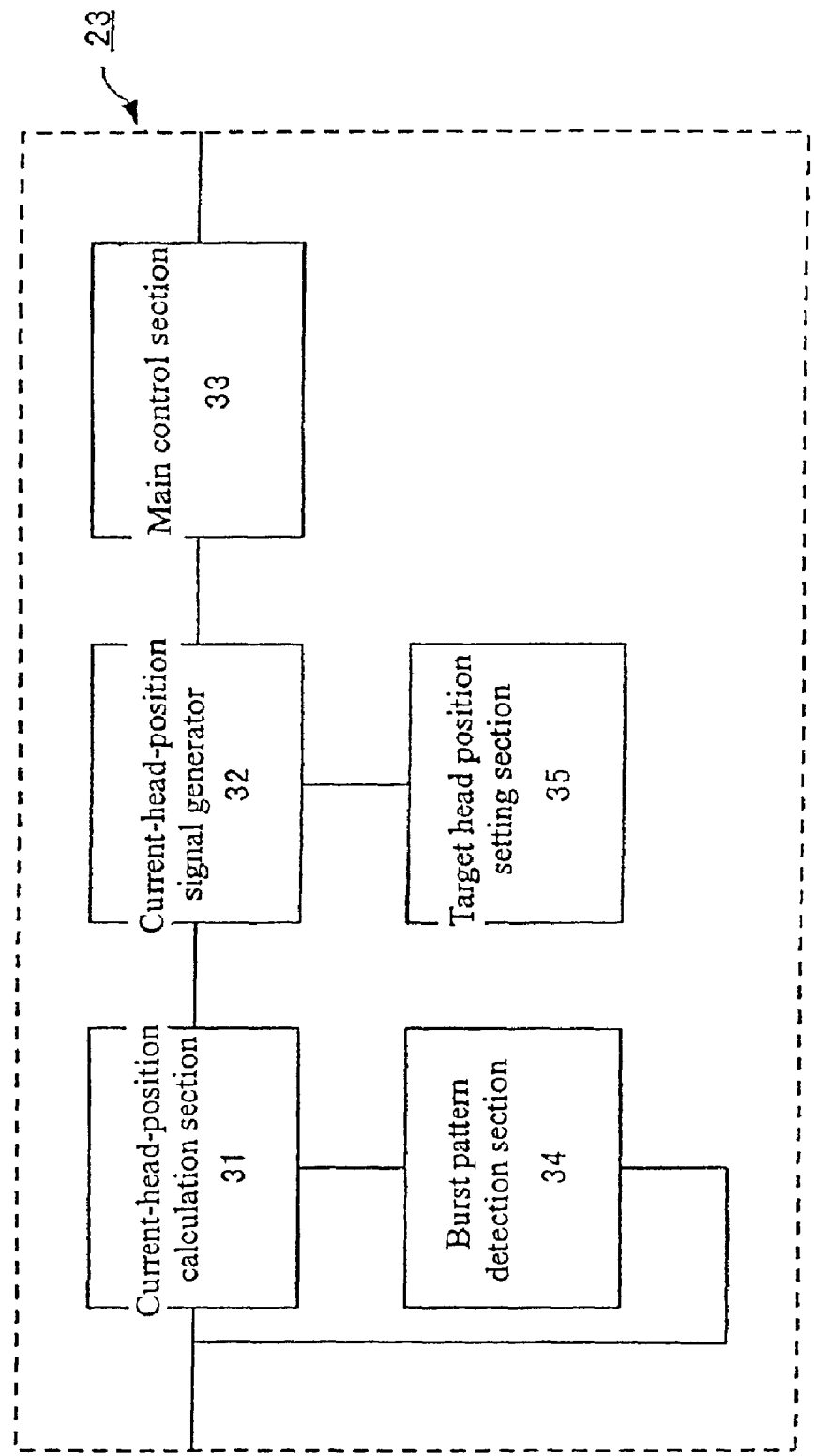

[Figure 5]
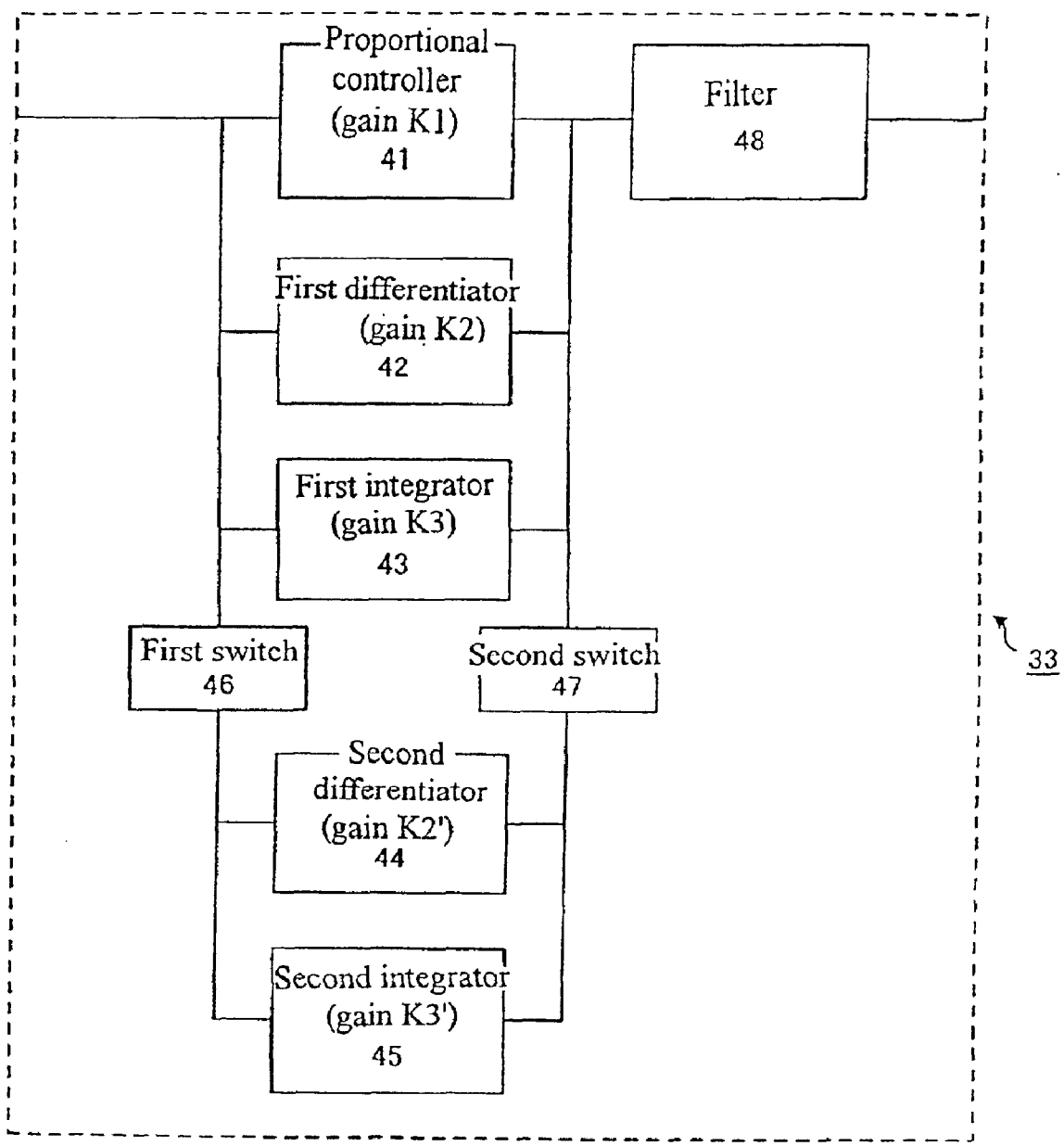

[Figure 6]
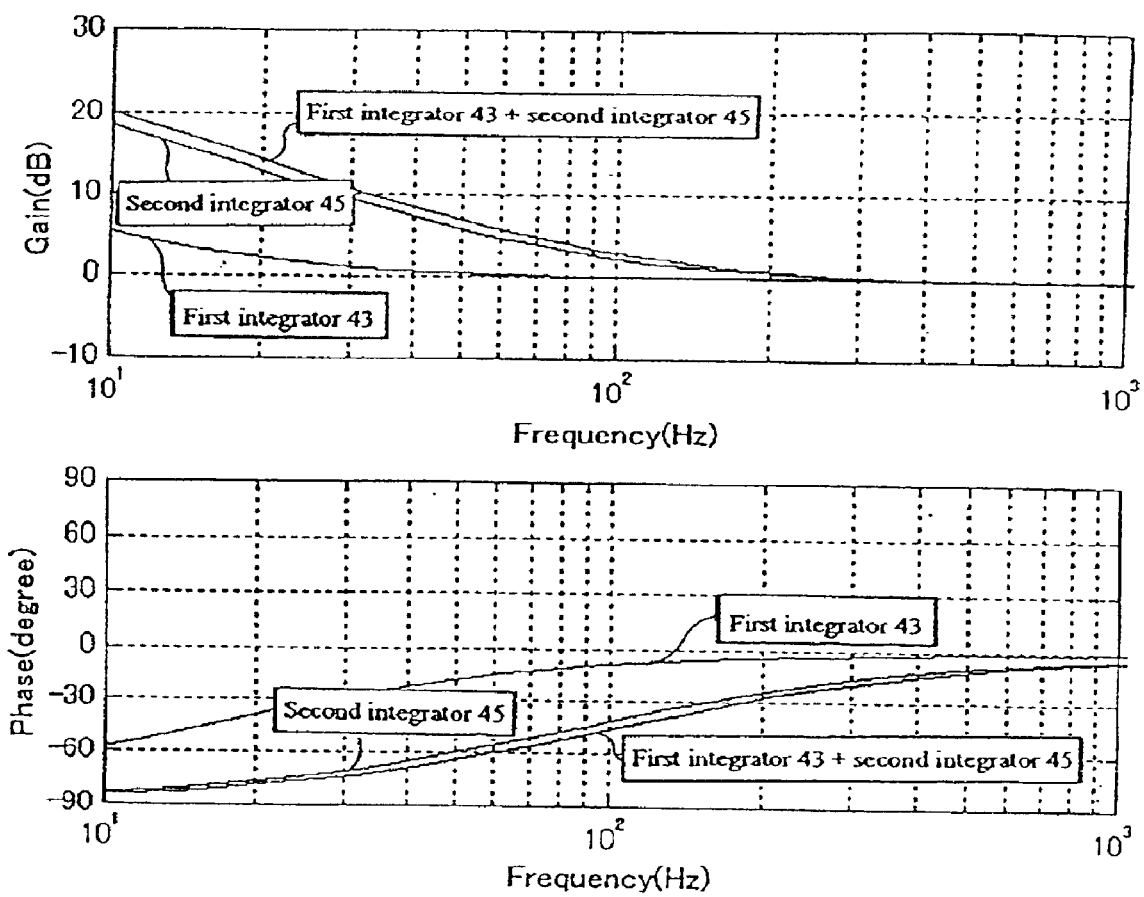

[Figure 7]
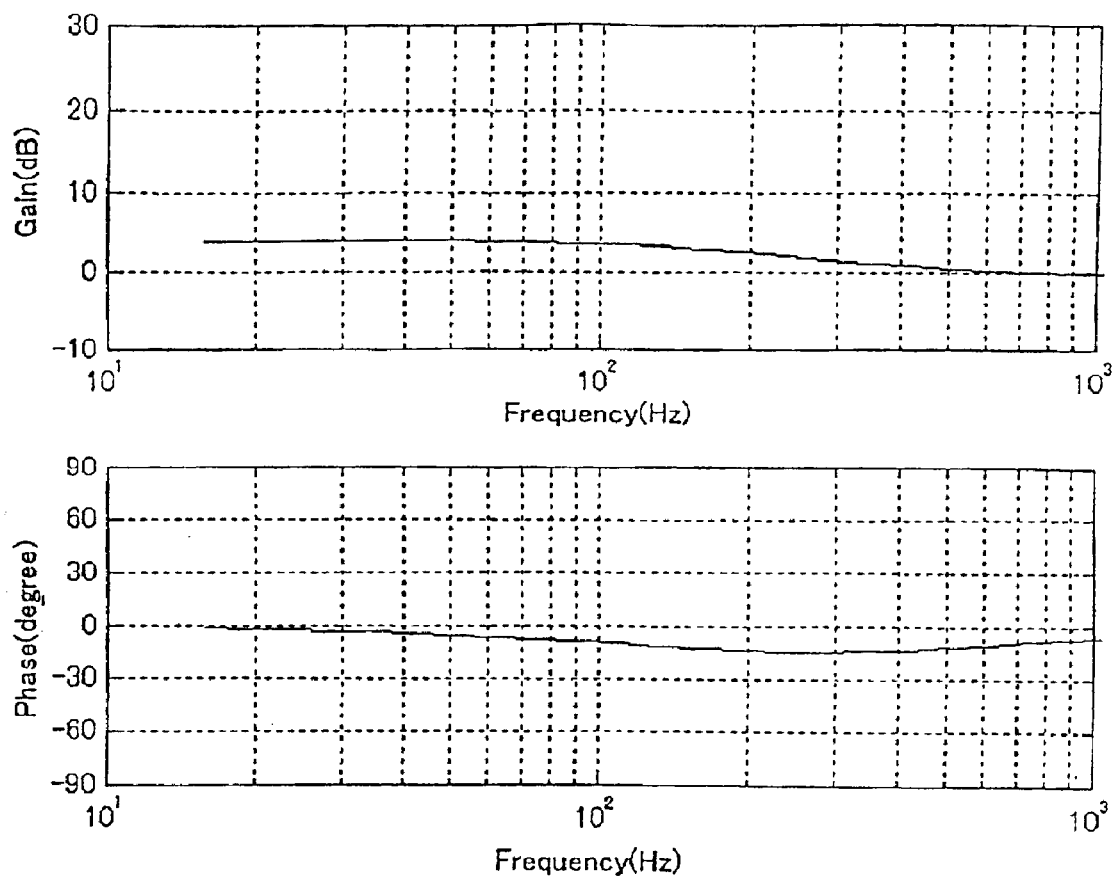

[Figure 8]
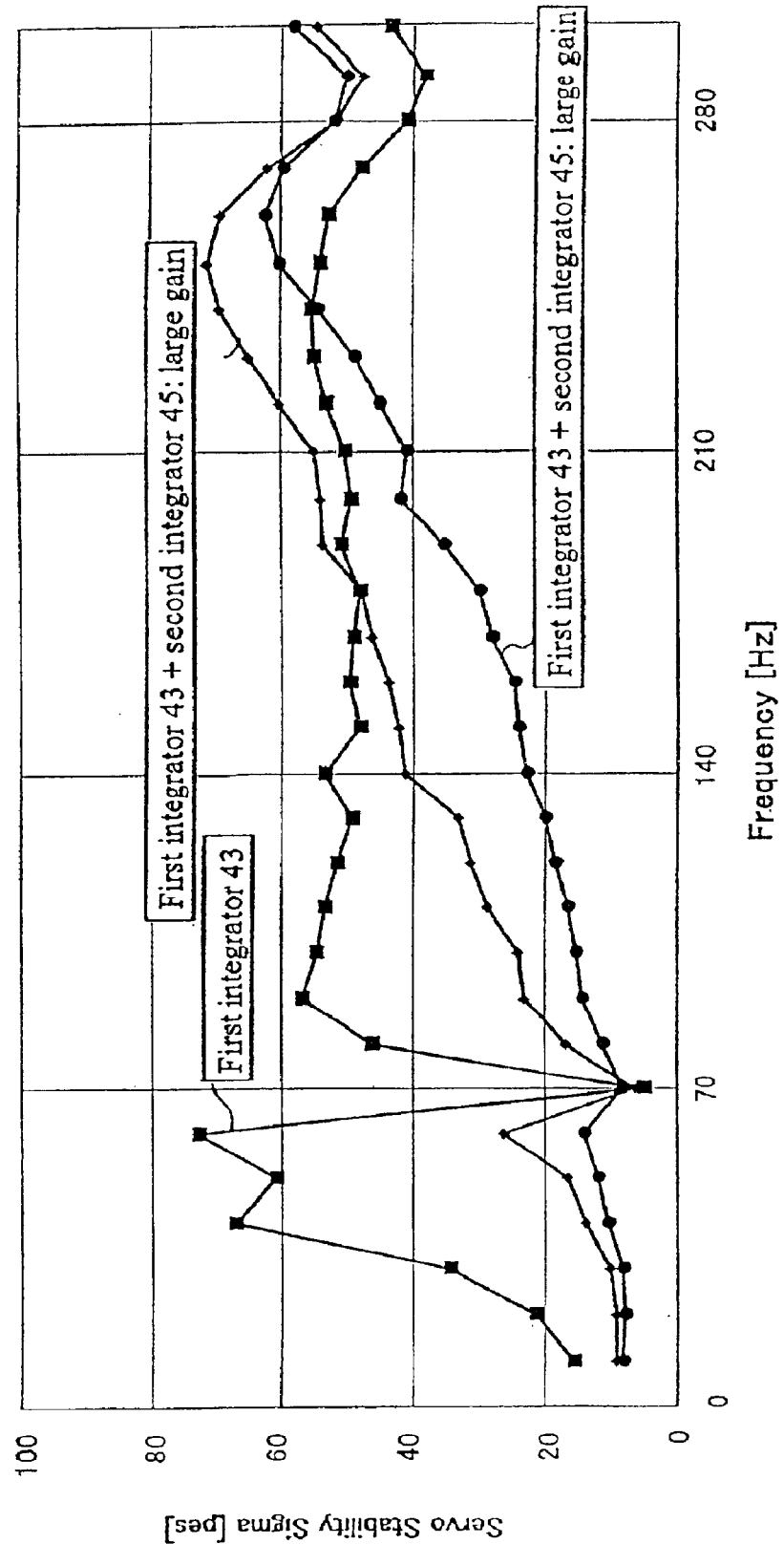

[Figure 9]
(a)
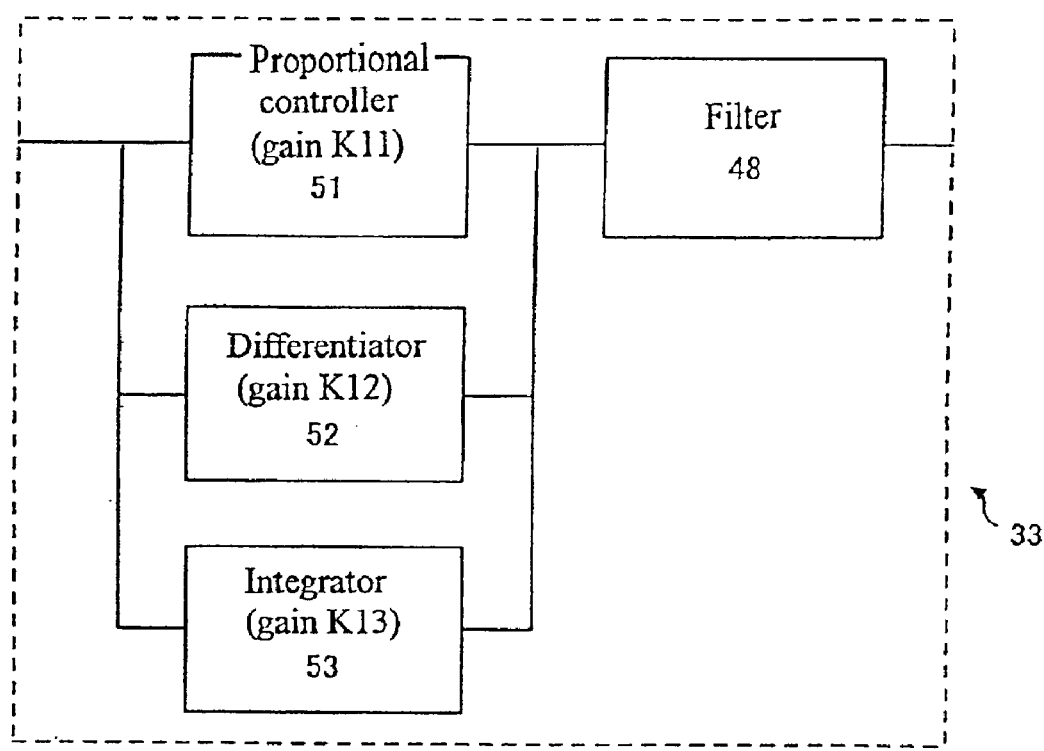
(b)
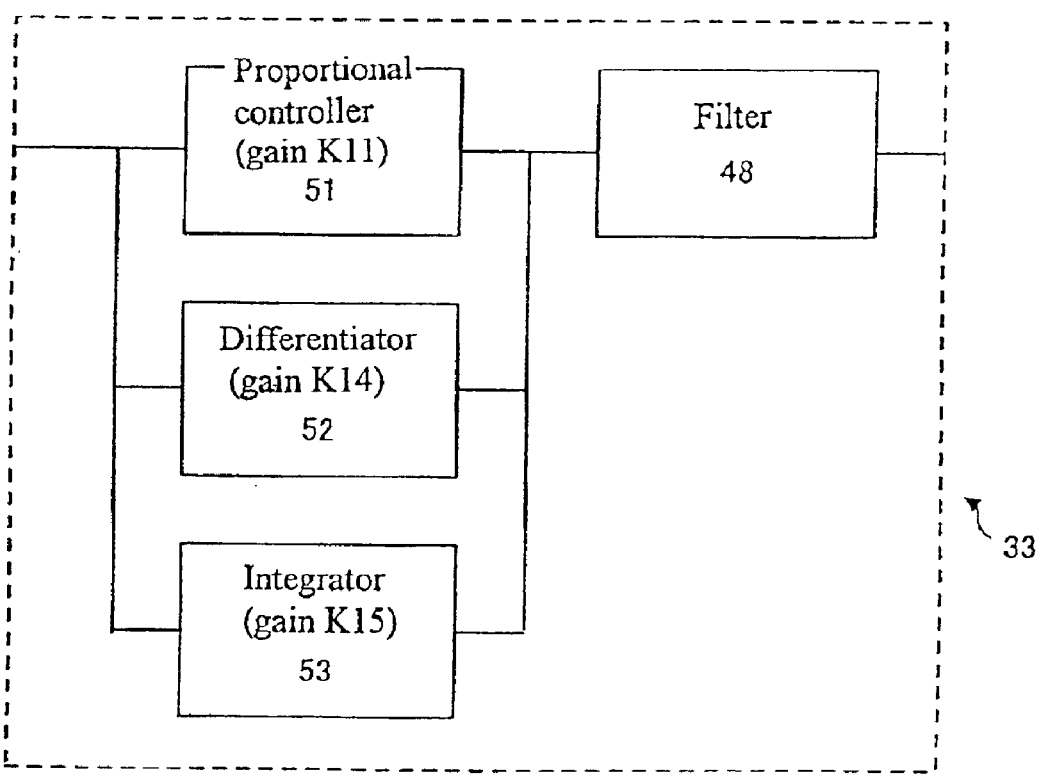

DISK DRIVE APPARATUS, HEAD POSITION CONTROL METHOD, AND HARD DISK DRIVE

This application claims the priority benefit of Japanese Patent Application No. 2001-055997, filed on Feb. 28, 2001, and entitled "Disk Drive Apparatus, Hard Disk Drive, Filter and Method for Inspecting Disk Drive Apparatus."

BACKGROUND OF THE INVENTION

1. Technical Field

The present invention relates to a disk drive apparatus as typified by a hard disk drive and more particularly to position control of a head that reads or writes data in a disk drive apparatus.

2. Description of the Related Art

The hard disk drive is one of the most widely used external storage for computers. As is well known, the magnetic disk, which is a storage medium of the hard disk drive, uses a sector as the smallest unit of data recording: a disk surface is divided concentrically into tracks, which are further divided radially into sectors. The nearer to the circumference of the magnetic disk, the higher the track recording density can be made. Therefore, zone bit recording (Zoned Bit Recording), which is the mainstream data recording method for magnetic disks, groups all the tracks into a number of zones and keeps the track recording density within each zone constant. Since a sector is normally 512 bytes long, the nearer to the circumference of the magnetic disk, the more sectors the track contains.

The hard disk drive has a magnetic head for reading or writing data from/to the magnetic disk. The magnetic head is mounted on an actuator mechanism which swings by means of a VCM (Voice Coil Motor). When the magnetic head reads or writes data, the actuator mechanism operates to move the magnetic head to a designated track and position it there. The process of moving and positioning the magnetic head is known as a seek. The magnetic head seeks to a designated track based on servo information stored on the magnetic disk.

As described above, the tracks on the magnetic disk are divided into a number of sectors. Each sector constitutes a data area where data is stored. Besides, the magnetic disk contains servo areas where servo information is stored. The servo areas store track identification information and burst patterns as the servo information. The track identification information represents the addresses of individual data tracks. It is read by the magnetic head to determine the track where the magnetic head is currently located. The burst patterns consists of an array of multiple signal storage areas out-of-phase to each other. The areas, each of which stores signals are laid at regular intervals in the radial direction of the magnetic disk. The signals output from the burst patterns makes it possible to determine the amount of deviation of the magnetic head from data tracks. When data is read from or written to the magnetic disk, which is rotating, position control is performed by checking the position of the magnetic head based on the servo information and driving the actuator mechanism and thus the magnetic head so as to correct any deviation.

3. Problems to be Solved by the Invention

When a magnetic head reads or writes data to/from a designated track on a magnetic disk, the positioning accuracy of the magnetic head comes into question. With recent improvement in the recording density of magnetic disks, there is demand for high positioning accuracy. The factors that impair the positioning accuracy of magnetic heads include disturbances. It is pointed out that disturbances can be caused by the tare weight of the actuator mechanism itself, the elastic force of flexible cables attached to the actuator mechanism, etc. In view of this, various techniques for positioning magnetic heads accurately have been proposed.

Data is read or written only after it is verified that the magnetic head is positioned accurately on a designated track. Therefore, even if a data read or write command is given, a data read or write must wait until the magnetic head is positioned. The positioning control techniques proposed so far have reduced the wait time for data reads/writes. However, it is reported that improved recording density has made it impossible to avoid the wait time for data read/write operations even with the positioning control techniques proposed so far.

Thus, it is an object of the present invention to provide a technique that can reduce the wait time for data read/write operations even on high density magnetic disks.

SUMMARY OF THE INVENTION

The inventor supposed that there may be some unreported factors which increases the wait time for data read/write operations, i.e., lowers the positioning accuracy of magnetic heads. Thus, the inventor observed the wait states for data read/write operations by operating personal computers (hereinafter abbreviated to PC) equipped with a hard disk drive in various environments. As a result, it was found that there were unreported factors which cause disturbances.

One of the factors is a CD-ROM drive fitted in the PC. That is, it was confirmed that low-frequency vibrations resulting from the rotation of a CD-ROM during the operation of the CD-ROM drive caused disturbances to the hard disk drive and that the servo's failure to absorb the disturbances sometimes prevented data write operations to the magnetic disk. As a more specific example, a phenomenon was observed in which an application stored in a CD-ROM could not be installed on a magnetic disk. It had often been the case for some time that applications stored in a CD-ROM were installed on a magnetic disk. However, as there had been no report of installation failures, it can be interpreted that further improvement in recording density caused the operation of the CD-ROM drive to hinder the positioning control of the magnetic disk. Although the discussion here is concerned with a CD-ROM drive, other devices that produce low-frequency mechanical vibrations may also hinder the positioning control of magnetic disks. Incidentally, the low frequency here means the frequency range not higher than 300 Hz.

Another factor is a portable telephone. There were cases in which data read/write operations from/to a magnetic disk were not carried out when a portable telephone was used around the PC. Further investigation confirmed that low-frequency electrical noise produced by an operating portable telephone entered the control system of an actuator mechanism, disabling servo tracking.

In hard disk drives, feedback position control including an integrator is used for the position control of the magnetic head. The integrator is intended to detect the bias force acting on the magnetic head when the magnetic head is staying at a designated location on the magnetic disk and then offset the bias force by passing a current equivalent to it through the VCM coil when the head seeks to this location the next time. Therefore, its gain cannot be increased.

Consequently, when disturbed by low-frequency vibration and noise, it becomes difficult to ensure servo tracking. Although it is expected that servo tracking can be improved by increasing the integrator gain, then the integrator will not perform its intended function.

Servo tracking is required only during track following when the magnetic head is staying on a designated track, i.e., when data is being read or written. Therefore, integrator gain is increased during this period. Conversely, during seeks when the magnetic head is moving to a designated track, the gain can be reduced, giving priority to offsetting the bias force.

To implement this approach, at least two concrete measures are available: one of them involves using two integrators that generate gains different in magnitude and operating them selectively as required, and the other involves using one integrator and switching its gains as required.

In view of the above, the present invention provides a disk drive apparatus comprising a disk-like medium for storing data; a head for reading or writing data from/to the above described disk-like medium; an actuator for moving the above described head to a designated location on the above described disk-like medium; and position control means which positions the above described head by controlling the operation of the above described actuator and which comprises a first integrator for generating a first gain and a second integrator for generating a second gain larger than the above described first gain.

Since the disk drive apparatus of the present invention comprises two integrators, i.e., the first integrator for generating a first gain and the second integrator for generating a second gain larger than the above described first gain, a gain can be selected according to the operational status of the head. This makes it possible to offset bias force during head seeks and ensure servo tracking during track following against disturbances in the low frequency range.

To allow the selection of an integrator according to the operational status of the head, it is desirable that the above described first integrator and the above described second integrator be connected in parallel. Then, when the above described head performs a seek operation for moving to a designated location on the above described disk-like medium and a follow operation for reading or writing data staying at the location, the above described first integrator can be operated during the above described seek operation and the above described second integrator can be operated during the above described follow operation. More specifically, switching means can be provided between the above described first integrator and the above described second integrator so that the above described first integrator will operate when the above described switching means closes during the above described seek operation and that the above described second integrator will operate when the above described switching means opens during the above described follow operation. Incidentally, it is also possible to set the first integrator to operate simultaneously with the second integrator.

The present invention also provides a disk drive apparatus comprising a disk-like medium for storing data; a head which performs a seek operation for moving to a designated location on the above described disk-like medium and a follow operation for reading or writing data staying at the above described designated location; an actuator for moving the above described head to the above described designated location on the above described disk-like medium; and position control means which positions the above described head by controlling the operation of the above described actuator and which comprises an integrator for generating a corresponding first gain during the above described seek operation and generating a second gain different from the above described first gain during the above described follow operation.

The disk drive apparatus of the present invention comprises an integrator for generating a corresponding first gain during the above described seek operation and generating a second gain different from the above described first gain during the above described follow operation. Therefore, by selecting between the first and second gains according to the operation of the head, it is possible to offset bias force during head seeks and ensure servo tracking during track following against disturbances in the low frequency range. More specifically, the above described second gain can be set larger than the above described first gain.

In the disk drive apparatus of the present invention, the above described integrator may consist of two integrators, namely, a first integrator for generating the above described first gain and a second integrator for generating the above described second gain.

In the disk drive apparatus of the present invention, the above described integrator may also consist of a single integrator. In that case, the above described integrator can be designed such that its gain will switch from the first gain to the second gain when a change from the above described seek operation to the above described follow operation takes place.

The present invention provides a head position control method for a disk drive apparatus. That is, the head position control method of the present invention, which involves controlling the position of a data read/write head on a storage medium based on servo information, controls the position of the above described head based on a first gain when the above described head is moving over the above described storage medium and controls the position of the above described head based on a second gain larger than the above described first gain when the above described head stays at a designated location on the above described storage medium.

In the head position control method of the present invention, the above described first gain can be set to such a value that will ensure the stability of operation while the above described head moves over the above described storage medium until it stops at the above described designated location. Also, the above described second gain can be set to such a value that will ensure servo tracking against disturbances in a low frequency range, specifically, in the frequency range not higher than 300 Hz while the above described head stays at the above described designated location.

A typical application of the present invention is a hard disk drive. A hard disk drive according to the present invention comprises a magnetic disk on which servo information is stored; a magnetic head which seeks the above described magnetic disk and reads or writes data staying at a designated location; an actuator for moving the above described magnetic head to the above described designated location on the above described magnetic disk; and head position control means which controls the position of the above described magnetic head based on the above described servo information read out by the above described magnetic head and which comprises an integrator, wherein the above described integrator generates a first gain and a second gain larger than the above described first gain, the above described first gain being generated when the above described magnetic head does not read or write data and the above described second gain being generated when the above described magnetic head reads or writes data.

In the hard disk drive of the present invention, the above described first gain can be generated when the above described magnetic head is seeking. Also, in the hard disk drive of the present invention, the above described integrator may consist of a first integrator for generating the above described first gain and a second integrator for generating the above described second gain. Furthermore, the above described integrator may generate the first gain and second gain, switching between them.

BRIEF DESCRIPTION OF THE DRAWINGS

FIG. 1 is a plan view showing the configuration of an HDD according to a first embodiment;

FIG. 2 is a diagram showing data storage areas and servo areas on a magnetic disk according to the first embodiment;

FIG. 3 is a block diagram showing the configuration for head position control according to the first embodiment;

FIG. 4 is a block diagram showing the configuration of an MPU for head position control according to the first embodiment;

FIG. 5 is a block diagram showing the configuration of a main control section of the MPU for head position control according to the first embodiment;

FIG. 6 is graphs showing the frequency characteristics of integrators according to the first embodiment;

FIG. 7 is graphs showing the effect of differentiators according to the first embodiment;

FIG. 8 is a graph showing the effect of servo stability according to the first embodiment; and FIG. 9 is a block diagram showing the configuration of an MPU for head position control according to a second embodiment.

DETAILED DESCRIPTION OF THE PREFERRED EMBODIMENT

The preferred embodiment of the present invention will be described below with reference to the drawings. A hard disk drive according to a first embodiment of the present invention is disclosed below with reference to FIG. 1. As shown in FIG. 1, a hard disk drive (HDD) 1, which is a disk drive apparatus, has a disk enclosure 10 comprising a box-shaped base 2 made, for example, of an aluminum alloy and a top cover 3 for sealing an open top of the base. The top cover 3 made, for example, of brass is screwed to the base, interposed with rectangular sealing material (not shown). Therefore, the disk enclosure 10 is airtight. FIG. 1 is a view in which part of the top cover 3 has been cut away.

Inside the disk enclosure 10 is a spindle motor (not shown) consisting of a three-phase DC servomotor of a hub-in structure. This spindle motor rotationally drives a magnetic disk 4, which is a storage medium. One or more magnetic disks 4 are installed depending on the storage capacity required by the HDD 1.

Also, an actuator arm 5 is installed in the disk enclosure 10. It has its middle portion rotatably supported on the base 2 via a pivot shaft 7. A magnetic head 8 is mounted on one end of the actuator arm 5 and a VCM (voice coil motor) coil 6 is mounted on the other end. The VCM coil 6 and a VCM stator 9 consisting of a permanent magnet constitute a VCM 11. When current is supplied to the VCM coil 6, the actuator arm 5 rotates toward a designated location on the magnetic disk 4. By means of this rotation, the magnetic head 8 performs a seek.

The magnetic disk 4 rotates around the spindle shaft of the spindle motor when the HDD 1 is in operation, but halts (stands still) when the HDD 1 is not in operation. As shown schematically in FIG. 2, a plurality of position information (servo information) storage areas 60 are formed radially on the surface of the magnetic disk 4, and data storage areas 61 are formed on the rest of the disk surface. The servo information, when read by the magnetic head 8, allows the location of the magnetic head 8 to be determined. It consists of track identification information and burst patterns. The track identification information represents the addresses of individual data tracks. It is read by the magnetic head 8 to determine the track where the magnetic head 8 is currently located. The burst patterns consist of an array of multiple signal storage areas out-of-phase to each other. The areas, each of which stores signals, are laid at regular intervals in the radial direction of the magnetic disk 4. The signals output from the burst patterns make it possible to determine the amount of deviation of the magnetic head 8 from data tracks.

The magnetic head 8 is driven by a circuit such as the one shown in FIG. 3. The signal output of the magnetic head 8 is connected to an input terminal of an amplifier (AMP) 21. The signals output from a lead element of the magnetic head 8 are amplified by the amplifier (AMP) 21. The amplifier (AMP) 21 output is input in a microprocessing unit (MPU) 23 via an analog/digital converter (A/D converter) 22.

The MPU 23 determines the position of the magnetic head 8, based on the signals received from the A/D converter 22, and sends out signals for position control of the magnetic head 8 to a VCM driver 24, based on the deviation between the determined position and target position of the magnetic head 8. In response to the input signals, the VCM driver 24 outputs a drive current to the VCM coil 6 which composes the VCM 11.

FIG. 4 is a block diagram illustrating the functions of magnetic-head 8 positioning means implemented by the MPU 23. The signals output from the A/D converter 22 are input in a current-head-position calculation section 31 and a burst pattern detection section 34. Based on the inputted signals, the burst pattern detection section 34 checks whether the magnetic head 8 matches the burst pattern storage area, and outputs the result to the current-head-position calculation section 31. If the burst pattern detection section 34 determines that the magnetic head 8 matches the burst pattern storage area, the current-head-position calculation section 31 takes in the signals output from the A/D converter 22, calculates the current position of the magnetic head 8 in the radial direction of the magnetic disk 4, and outputs the result. Therefore, the current-head-position calculation section 31 outputs the current position of the magnetic head 8 at designated intervals. These functions may be implemented not only by hardware, but also by software.

A target head position setting section 35 sets and outputs the target position of the magnetic head 8 in terms of radial position on the magnetic disk 4. The current position of the magnetic head 8 outputted from the current-head-position calculation section 31 and the target head position outputted from the target head position setting section 35 are input in a current-head-position signal generator 32, which then compares the position signals and outputs a signal y(n) which represents the magnitude and direction of the deviation. The signal y(n) is input in a main control section 33, which sends out control signals to the VCM driver 24 based on the signal y(n).

FIG. 5 is a block diagram showing the main control section 33 of the MPU 23. As shown in FIG. 5, the main control section 33 consists of a proportional controller (gain K1) 41, first differentiator (gain K2) 42, first integrator (gain K3) 43, second differentiator (gain K2') 44, second integrator (gain K3') 45, first switch 46, second switch 47, and filter 48. Also as shown in FIG. 5, the proportional controller 41 is connected in parallel with the first differentiator 42 and first integrator 43 while the first integrator 43 is connected in parallel with the second differentiator 44 and second integrator 45. The proportional controller 41 performs negative feedback control.

The first integrator 43 and second integrator 45 perform different functions. The first integrator 43 is intended to detect the bias force acting on the magnetic head 8 when the magnetic head 8 is staying at a designated location on the magnetic disk 4, and then offset the bias force by passing a current equivalent to it through the VCM coil 6 when the magnetic head 8 seeks to this location the next time. By offsetting the bias force, it is possible to speed up the seek to the designated location. For this reason, the gain of the first integrator 43 cannot be increased too much. Consequently, the first integrator 43 alone cannot ensure servo tracking against low-frequency vibration caused by the operation of a CD-ROM drive or against low-frequency noise caused by the use of portable telephones. Therefore, this embodiment uses the second integrator 45. Since the second integrator 45 does not need to offset the bias force acting on the magnetic head 8, its gain is made larger than that of the first integrator 43. Specifically, if K3 denotes the gain of the first integrator 43 and K3' denotes the gain of the second integrator 45, K3 and K3' are set such that K3<K3'. It is important, of course, that the gain K3' of the first integrator 43 be set so as to improve servo tracking in the low frequency range against the low-frequency vibration caused by the operation of the CD-ROM drive and low-frequency noise caused by the use of portable telephones.

As described above, the first integrator 43 and second integrator 45 have different purposes and thus should function at different times. The first integrator 43 should function during the seek operations of the magnetic head 8. However, if the second integrator 45 functions during the seek operations of the magnetic head 8, it will make the seek operations unstable. Therefore, it is desirable that the second integrator 45 should function during track following when the magnetic head 8 stays at a designated location on the magnetic disk 4. Thus, the first switch 46 and second switch 47 are provided as the switching means for activating the second integrator 45 in addition to the first integrator 43. The first switch 46 and second switch 47 are opened and closed in sync with the seek operation of the magnetic head 8. Specifically, during the seek operations of the magnetic head 8, the first switch 46 and second switch 47 are closed to activate only the first integrator 43. On the other hand, during the track-follow operations of the magnetic head 8, i.e., when data is read or written, the first switch 46 and second switch 47 are opened to activate the second integrator 45 as well. Although this configuration also activates the first integrator 43 at this time, it is also possible to adopt a circuit configuration that will activate only the second integrator 45.

FIG. 6 shows the respective frequency characteristics of the first integrator 43 and second integrator 45 as well as the frequency characteristics of the combination of the first integrator 43 and second integrator 45. As shown in the figure, the gain of the second integrator 45 is set larger than that of the first integrator 43.

The use of only the first integrator 43 and second integrator 45 would cause the phase to rotate, making the control system unstable. Thus, the first differentiator 42 and second differentiator 44 are used in addition, as shown in FIG. 5, to correct the phase lag between the first integrator 43 and second integrator 45. FIG. 7 shows the frequency characteristics obtained by the combination of the first integrator 43 and second integrator 45 and then phase-corrected by the first differentiator 42 and second differentiator 44.

An experiment was conducted to verify the effect of this embodiment. While giving vibration by means of a vibration tester to a PC equipped with the HDD 1 of the present invention, servo stability sigma [pes] was compared between the condition in which the second integrator 45 was operated and the condition in which the second integrator 45 was not operated. Results are shown in FIG. 8. As shown in the figure, it was confirmed that the servo stability in the low frequency range was higher when the second integrator 45 was operated than when it was not operated. It can be seen that when the second integrator 45 is operated, increasing the gain produces great improvement in the servo stability in the low frequency range. Incidentally, the high stability at 70 Hz in FIG. 8 is attributable to a peak filter.

Second Embodiment

In the above embodiment, the first integrator 43 and second integrator 45 which differ in gain are provided and the opening and closing of the first switch and second switch 47 are controlled in sync with the operation of the second integrator 45. However, the present invention is not limited to the configuration in which two integrators—the first integrator 43 and second integrator 45—are used. A single integrator can give similar effect. An example will be described as a second embodiment with reference to FIG. 9. The basic configuration of the HDD 1 according to the second embodiment is similar to the HDD 1 according to the first embodiment. The difference between them—specifically, the main control section 33 of the MPU 23—will be described here. The same components as those of the first embodiment are denoted by the same reference numerals.

FIG. 9 is a block diagram showing the configuration of the main control section 33 according to the second embodiment. FIG. 9A shows the state in which a magnetic head 8 is in the seek mode while FIG. 9B shows the state in which the magnetic head 8 is in the track follow mode. The main control section 33 is composed of a proportional controller 51, differentiator 52, integrator 53, and filter 48. In the second embodiment, the integrator 53 gain is variable. Specifically, if K13 denotes the integrator 53 gain when the magnetic head 8 is in the seek mode and K15 denotes the integrator 53 gain the magnetic head 8 is in the track follow mode, then K13<K15 holds. Also, let K12 denote the differentiator 52 gain when the magnetic head 8 is in the seek mode and let K14 denote the differentiator 52 gain when the magnetic head 8 is in the track follow mode, then K12<K14 holds.

In this way, according to the second embodiment, the gains of the differentiator 52 and integrator 53 are varied in sync with the seek operations of the magnetic head 8. Besides, the gains are set low during the seek operations of the magnetic head 8 to ensure stability of the seek operations. When the magnetic head 8 completes a seek operation the gains are set high to ensure servo tracking in the low frequency range. Thus, the HDD 1 of the second embodiment gives the same effect as the HDD 1 of the first embodiment.

As described above, the present invention has the advantage of improving servo tracking characteristics in the low frequency range without impairing the stability of seek operations. Thus, it can reduce the wait time for data read/write operations even on high density magnetic disks.

What is claimed is:

1. A disk drive apparatus, comprising:

a disk like medium for storing data;

a head that reads data from and writes data to the disk like medium, wherein the head performs a seek operation for moving to a designated location on the disk like medium and a follow operation for reading or writing data when staying at the location:

an actuator that moves the head to a designated location on the disk like medium; and a position control unit that positions the head by controlling a drive of the actuator, the position control unit comprising:

a first integrator that generates a first gain and operates during the seek operation; and a second integrator that generates a second gain that is larger than the first gain and operates during the follow operation.

2. The disk drive apparatus according to claim 1, wherein the first integrator and the second integrator are connected in parallel.

3. The disk drive apparatus according to claim 1, wherein:

a switching unit is provided between the first integrator and the second integrator;

the first integrator operates when the switching unit closes during the seek operation; and the second integrator or both first integrator and second integrator operate when the switching unit opens during the follow operation.

4. A disk drive apparatus, comprising:

a disk like medium for storing data;

a head which performs a seek operation for moving to a designated location on the disk like medium and a follow operation for reading or writing data staying at the designated location; an actuator which moves the head to the designated location on the disk like medium; and a position control unit which positions the head by controlling an operation of the actuator; wherein the position control unit comprises:

an integrator which generates a corresponding first gain during the seek operation and a second gain different from the first gain during the follow operation.

5. The disk drive apparatus according to claim 4, wherein the second gain is larger than the first gain.

6. The disk drive apparatus according to claim 4, wherein the integrator comprises a first integrator which generates the first gain and a second integrator which generates the second gain.

7. The disk drive a apparatus according to claim 4, wherein the integrator switches from the first gain to the second gain when a change from the seek operation to the follow operation takes place.

8. A hard disk drive, comprising:

a magnetic disk on which servo information is stored;

a magnetic head that seeks the magnetic disk and reads or writes data staying at a designated location;

an actuator that moves the magnetic head to the designated location on the magnetic disk; and a head position control unit that controls the position of the magnetic head based on the servo information read out by the magnetic head and that comprises an integrator, wherein:

the integrator generates a first gain and a second gain larger than the first gain, the first gain being generated when the magnetic head does not read or write data and the second gain being generated when the magnetic head reads or writes data.

9. The hard disk drive according to claim 8, wherein the first gain is generated when the magnetic head is seeking.

10. The hard disk drive according to claim 8, wherein the integrator is composed of a first integrator which generates the first gain and a second integrator which generates the second gain.

11. The hard disk drive according to claim 8, wherein the integrator generates the first gain and second gain, switching between them.

* * * * *